United States Patent
Ayadurai et al.

(10) Patent No.: US 9,699,795 B2
(45) Date of Patent: Jul. 4, 2017

(54) METHOD AND APPARATUS FOR PRIMARY CHANNEL DETECTION

(71) Applicant: Telefonaktiebolaget L M Ericsson (publ), Stockholm (SE)

(72) Inventors: Vicknesan Ayadurai, Sollentuna (SE); Jung-Fu Cheng, Fremont, CA (US); Anders Furuskär, Stockholm (SE); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 9 days.

(21) Appl. No.: 14/514,584

(22) Filed: Oct. 15, 2014

(65) Prior Publication Data

US 2016/0007362 A1    Jan. 7, 2016

Related U.S. Application Data

(60) Provisional application No. 62/021,413, filed on Jul. 7, 2014.

(51) Int. Cl.
*H04W 4/00* (2009.01)
*H04W 72/08* (2009.01)
*H04W 72/04* (2009.01)
*H04W 16/14* (2009.01)
*H04W 84/12* (2009.01)
*H04W 24/08* (2009.01)

(52) U.S. Cl.
CPC ......... *H04W 72/085* (2013.01); *H04W 16/14* (2013.01); *H04W 72/0453* (2013.01); *H04W 72/0486* (2013.01); *H04W 24/08* (2013.01); *H04W 72/082* (2013.01); *H04W 84/12* (2013.01)

(58) Field of Classification Search
CPC ............... H04W 72/085; H04W 84/12; H04W 72/0453; H04W 24/08; H04W 72/0486; H04W 16/14; H04W 72/082
See application file for complete search history.

(56) References Cited

U.S. PATENT DOCUMENTS

| | | | | |
|---|---|---|---|---|
| 5,287,544 A | * | 2/1994 | Menich | H04W 72/082 455/436 |
| 8,238,496 B1 | * | 8/2012 | Narasimhan | H04L 25/0208 375/231 |

(Continued)

FOREIGN PATENT DOCUMENTS

| | | |
|---|---|---|
| WO | 2012101481 A1 | 8/2012 |
| WO | 2013152305 A1 | 10/2013 |
| WO | 2014039380 A2 | 3/2014 |

*Primary Examiner* — Robert Wilson
(74) *Attorney, Agent, or Firm* — Murphy, Bilak & Homiller, PLLC

(57) ABSTRACT

Methods and apparatuses are provided for mitigating interference in a Wireless Local Access Network or WLAN that may be caused by a radio node. Signal measurements are monitored at frequencies corresponding to one or more WLAN channels in one or more frequency bands. It is determined, based on the signal measurements at the frequencies, whether there are any channels among possible primary and secondary channel pairings of the WLAN channels that are being used by the WLAN as secondary channels. Spectrum usage by the radio node is controlled in dependence on the determination.

29 Claims, 11 Drawing Sheets

(56) References Cited

U.S. PATENT DOCUMENTS

| | | | |
|---|---|---|---|
| 2006/0159003 A1* | 7/2006 | Nanda | H04W 16/10 370/203 |
| 2009/0285116 A1* | 11/2009 | Nanda | H04W 72/02 370/252 |
| 2010/0211685 A1* | 8/2010 | McDowall | H04L 63/061 709/227 |
| 2011/0044283 A1* | 2/2011 | Rubin | H04W 8/02 370/331 |
| 2012/0044915 A1* | 2/2012 | Oerton | H04W 24/02 370/338 |
| 2012/0225687 A1* | 9/2012 | Norair | H04L 1/0061 455/522 |
| 2015/0016288 A1* | 1/2015 | Maattanen | H04B 7/066 370/252 |
| 2015/0350382 A1* | 12/2015 | Abraham | H04L 69/14 370/276 |
| 2016/0007362 A1* | 1/2016 | Ayadurai | H04W 72/085 370/329 |

* cited by examiner

METHOD AND APPARATUS FOR PRIMARY CHANNEL DETECTION

RELATED APPLICATIONS

This application claims priority from U.S. Provisional Application No. 62/021,413 filed on Jul. 7, 2014, which is incorporated herein by reference in its entirety.

TECHNICAL FIELD

Embodiments of the present invention generally relate to wireless communication networks, and particularly relate to controlling spectrum usage by a radio node to mitigate interference with respect to primary channels of a Wireless Local Access Network, WLAN.

BACKGROUND

Earlier releases of the Institute of Electrical and Electronics Engineers, IEEE, Wireless Local Access Network, WLAN, standards, such as 802.11g, specified 20 MHz wide radio channels for use in wireless communications. These 20 MHz channels are allocated from the 2.4 GHz or 5 GHz industrial, scientific and medical, ISM, band range and occupy defined channel frequencies within the relevant spectrum. More recent specifications of the standard, such as 802.11n, support 40 MHz wide channels (or more such as for 802.11ac), with the goal of increasing data throughput. These newer WLAN specifications specify a primary 20 MHz channel as well as an adjacent secondary 20 MHz channel.

A WLAN access point or AP may broadcast system parameters in its beacon periodically over the primary channel. Newer APs configured to support primary and secondary channel pairings transmit data on a primary channel and, if necessary, simultaneously transmit data on the correspondingly paired secondary channel in parallel, resulting in a higher data throughput and an increase in occupied bandwidth from 20 MHz to 40 MHz. The secondary channel may be considered to "supplement" the corresponding primary channel when exchanging data between a device and the AP. As secondary channels are dynamically added and removed depending on need and availability, the AP typically uses primary channels to transmit management information and other key signaling.

Correspondingly, it is recognized herein that primary channels in a WLAN system are in some sense more important or of higher priority than secondary channels, at least from the perspective of an outside interferer, such as from the perspective of a radio node as contemplated in this disclosure. However, in a common case where the radio node is not configured to decode WLAN transmissions, discerning WLAN channel usage by the radio node is difficult at best, and is made even more problematic because the radio circuitry in such a radio node typically is not matched to the WLAN radio circuitry. Because of the mismatch, the radio circuitry in the radio node may experience signal "leakage" when receiving a signal from a WLAN transmitter, which further clouds the ability of the radio node to discern WLAN channel usage.

SUMMARY

Embodiments set forth in the present disclosure describe methods and apparatuses for controlling spectrum usage by a radio node in a manner that mitigates interference caused by the radio node with respect to primary channels in a Wireless Local Access Network or WLAN. In the context of this interference mitigation, it shall be understood that the radio node at issue is operating as a non-WLAN radio node but transmits and/or receives signals in a frequency range overlapping with one or more WLAN channel frequencies. As non-limiting examples, the radio node is a cellular communication network or wireless device configured to operate in a frequency spectrum that at least partially overlaps one or more WLAN channel frequencies.

According to some embodiments, a method of controlling a non-WLAN radio node to control spectrum usage to mitigate interference in primary channels of a WLAN network includes monitoring signal measurements at frequencies corresponding to one or more WLAN channels in one or more frequency bands. The method also includes determining, based on the signal measurements, whether there are any channels among possible primary and secondary channel pairings of the WLAN channels that are being used by the WLAN network as secondary channels and controlling spectrum usage by the radio node based on said determining.

The determining step in some embodiments includes blindly detecting whether any WLAN channels among the possible primary and secondary channel pairings are being used by the WLAN network as secondary channels. This blind detection is done without decoding the WLAN signal transmissions. In the same or other embodiments, the step of controlling spectrum usage includes controlling carrier frequency selection by the radio node to favor selection of carrier frequencies corresponding to ones of the WLAN channels determined as being secondary channels. In an example case, the WLAN is a WiFi network and the WLAN channels at issue are WiFi channels.

According to some embodiments, a radio node configured to control spectrum usage to mitigate interference in primary channels of a WLAN network includes a transceiver circuit configured to transmit and receive wireless signals and a processing circuit operatively connected to the transceiver circuit. The processing circuit is configured to monitor received signal measurements at frequencies corresponding to one or more WLAN channels in one or more frequency bands. The processing circuit is also configured to determine, based on the signal measurements, whether there are any channels among possible primary and secondary channel pairings of the one or more WLAN channels that are being used by the WLAN network as secondary channels. Correspondingly, the processing circuit is configured to control spectrum usage by the radio node based on the determination.

According to some embodiments, a non-transitory computer readable storage medium stores a computer program comprising program instructions which, when executed by a processing circuit of a radio node, causes the processing circuit to perform operations to control spectrum usage by the radio node to mitigate interference in primary channels of a WLAN network. In particular, the computer program includes program instructions to cause the processing circuit of the radio node to monitor signal measurements at frequencies corresponding to one or more WLAN channels in one or more frequency bands and determine, based on the signal measurements, whether there are any channels among possible primary and secondary channel pairings of the WLAN channels that are being used by a WLAN network as secondary channels. The program instructions also cause the processing circuit to control spectrum usage by the radio node based on the determination.

According to some embodiments, a radio node is configured to control spectrum usage to mitigate interference in primary channels of a WLAN network. In an example configuration, the radio node at least functionally includes a monitoring module configured to monitor signal measurements at frequencies corresponding to one or more WLAN channels in one or more frequency bands. The radio node also includes a determining module configured to determine, based on the signal measurements, whether there are any channels among possible primary and secondary channel pairings of the WLAN channels that are being used by the WLAN network as secondary channels. The radio node also includes a controlling module configured to control spectrum usage by the radio node based on the determining.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
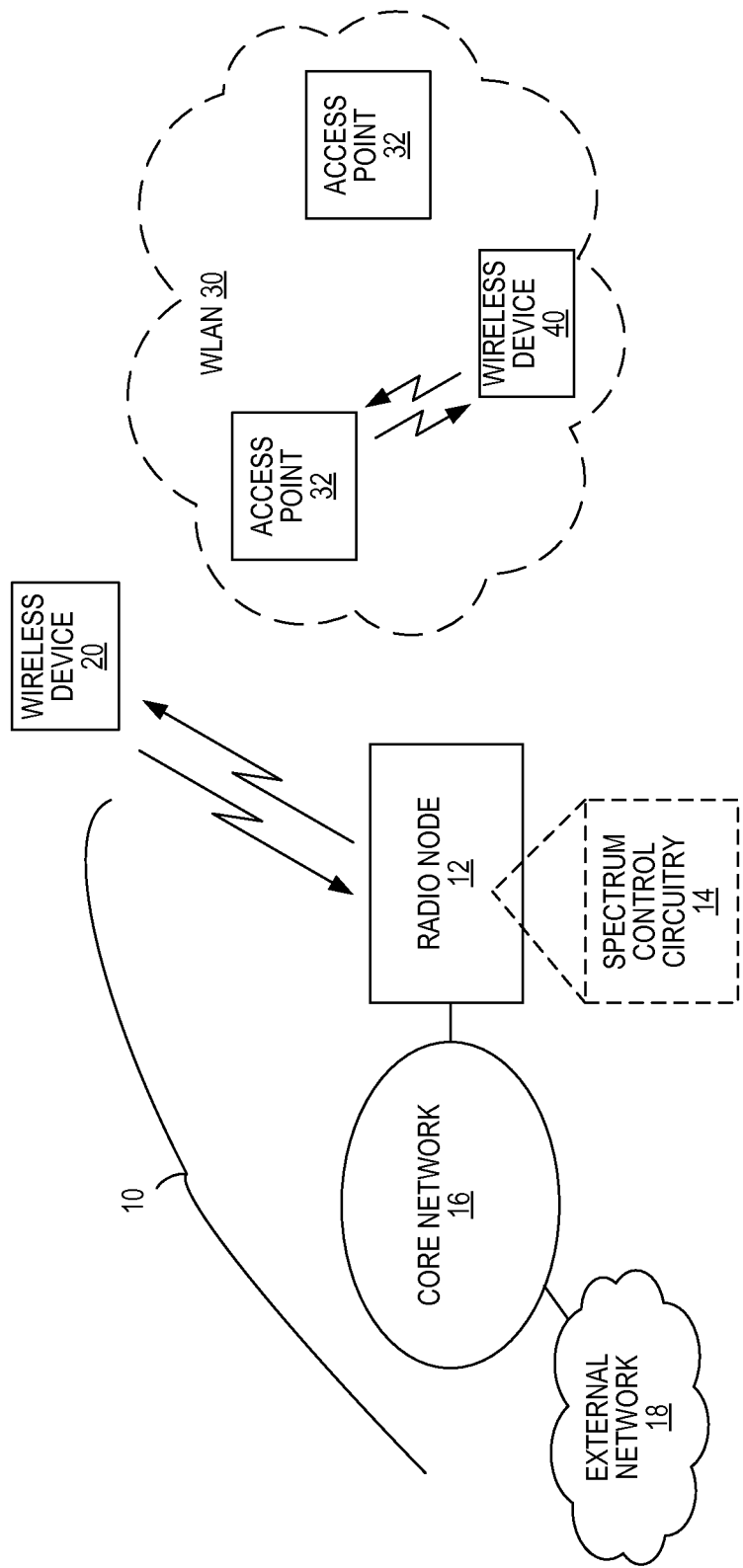
FIG. 1 is a block diagram of a communication network including a radio node having spectrum control circuitry configured to control spectrum usage to mitigate interference in primary channels of a WLAN network, according to some embodiments.

FIG. 1 illustrates a wireless communication network 10, hereafter referred to as "the network 10". The network 10 includes a base station or other radio node 12, which in turn includes spectrum control circuitry 14. The radio node 12 communicatively couples to one or more entities in a core network or CN 16. In operation, the network 10 provides one or more types of communication services to a wireless device 20. For example, the network 10 communicatively couples the wireless device 20 for voice and/or data services to other devices within the network 10 and/or to devices or system accessible through one or more external networks 18, such as the Internet or another Packet Data Network, PDN.

The network 10 comprises, for example, a cellular communication network, e.g., a cellular network configured according to the Long Term Evolution or LTE specifications. In this regard, the network 10 shall be understood as being a Wide Area Network or WAN, rather than being a Wireless Local Access Network or WLAN. To emphasize that distinction, the radio node 12 may be referred to as a "non-WLAN" radio node. It should also be noted that the depiction of the network 10 is simplified in certain respects. For example, no core network nodes are shown and only one radio node 12 is depicted. In actual implementation, the network 10 may include a potentially large number of radio nodes 12, e.g., arranged as a geographically distributed network of radio base stations.

In turn, each such radio node 12 may provide communication services to a potentially large number of wireless devices 20 operating within the coverage area or areas of each radio node 12. These coverage areas are often referred to as "cells", where a cell may be understood as the allocation of particular radio resources to a particular geographic area, such as where a particular carrier frequency is used to cover a corresponding geographic area. Depending on their configuration, cells may partially or wholly overlap. For example, the radio node 12 may provide overlapping cells by using different carrier frequencies in each cell. In another example, one or more neighboring radio nodes—not shown in the diagram—may provide cells on the same carrier frequency as used by the radio node 12 and/or on different carrier frequencies.

Thus, depending on the configuration of the network 10 and the wireless device 20, the wireless device 20 may be "served" by one cell or by more than one cell, where the "more than one cell" may involve the same radio node 12 or may involve two or more such radio nodes. Of particular interest herein, the radio node 12 is configured to operate at least one cell at least some of the time in a frequency spectrum that is used by a WLAN 30, which may be presumed to operate within radio range of the network 10.

Advantageously, as will be detailed further herein, the spectrum control circuitry 14 of the radio node 12 is configured to control spectrum usage by the radio node 12 to mitigate interference seen by the WLAN 30, at least on so called "primary" channels of the WLAN 30. For example, the WLAN 30 is configured to operate as an IEEE 802.11 WiFi network and makes use of primary and secondary channels at specified channel frequencies and in accordance with predefined primary/secondary channel pairings that stipulate which pairs of defined WiFi channels can be operated as a primary and secondary channel pair.

By way of non-limiting example, the depicted WLAN 30 includes some number of access points 32 that communicate with a wireless device 40 that is configured for operation in the WLAN 30. The WLAN 30 operates, for example, according to the IEEE 802.11 WiFi standards, which define a number of WiFi channels at particular frequencies within, e.g., the 5 GHz spectrum. Further, the WiFi standards define which WiFi channels may be operated as primary and secondary channel pairs. The primary channel carries periodic beacons and management subframes. A secondary channel may be used with the primary channel together to send data packets.

With respect to operations relevant to this discussion, the radio node 12 is a non-WLAN node, meaning that it is not configured for operation in the WLAN 30 and is not configured to decode WLAN transmissions. However, in at least some configurations or at least in some instances, the radio node 12 operates in a frequency spectrum that at least partially overlaps the spectrum used by the WLAN, e.g., the unlicensed 5 GHz band. Correspondingly, the radio node 12 is configured according to the teachings herein to make received signal measurements at frequencies corresponding to defined WLAN channels, to process or otherwise evaluate those measurements to determine whether there are any WLAN channels being used as secondary channels, and to control its spectrum usage in dependence on that determination. Here, controlling spectrum usage comprises controlling the frequency or frequencies used for transmissions by the radio node 12 and/or controlling the frequency or frequencies used for transmissions to the radio node 12, e.g., uplink transmissions by the wireless device 20.

In particular, the radio node 12 includes spectrum control circuitry 14 configured to control spectrum usage to mitigate interference in primary channels of the WLAN 30 by monitoring signal measurements at frequencies corresponding to WLAN channels. The spectrum control circuitry 14 determines, based on the received signal measurements made by the radio node 12 at the WLAN channel frequencies, whether there are any channels among possible primary and secondary channel pairings of the WLAN channels that are being used by the WLAN 30 as secondary channels. The spectrum control circuitry 14 controls spectrum usage by the radio node 12 based on this determination. For example, the determination controls transmit and/or receive frequency selection by the radio node 12, or at least serves as one input into a frequency selection process carried out by the radio node 12.

Figure 2:
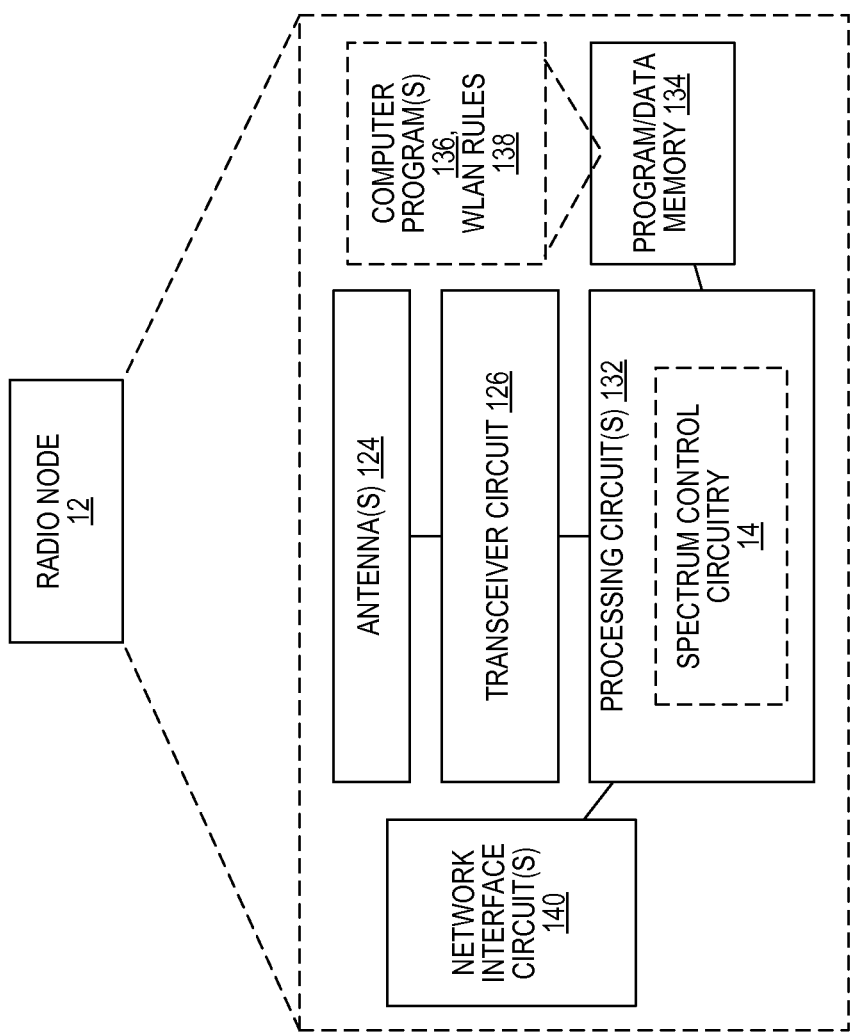
FIG. 2 is a block diagram of the spectrum control circuitry, according to some embodiments.

FIG. 2 illustrates a diagram of the radio node 12, according to some embodiments. The radio node 12 provides an air interface, e.g., an LTE air interface for downlink transmission and uplink reception, which is implemented via antennas 124 and a transceiver circuit 126. The transceiver circuit 126 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced. The radio node 12 may also include network interface circuits 140 for communicating with nodes in the core network 16, other peer radio nodes, and/or other types of nodes in the network 10.

The radio node 12 also includes one or more processing circuits 132 that are operatively associated with the radio transceiver circuit 126. For ease of discussion, the one or more processing circuits 132 are referred to hereafter as "the processing circuit 132". The processing circuit 132 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 132 may comprise fixed circuitry, or programmable circuitry that is specially adapted via the execution of program instructions implementing the functionality taught herein, or may comprise some mix of fixed and programmed circuitry.

The processing circuit 132 at least functionally includes the aforementioned spectrum control circuitry 14. As described above, the spectrum control circuitry 14 controls spectrum usage by the radio node 12 to lessen or mitigate any signal interference with respect to one or more primary WLAN channels. For example, in at least some instances, the radio node 12 makes received signal measurements at frequencies corresponding to WLAN channels, processes or otherwise evaluates those measurements to determine whether it appears that one or more WLAN channels are being used as secondary channels in the WLAN, and controls its spectrum usage in dependence on that determination. For example, the radio node 12 selects a frequency or frequency for its own usage that corresponds to or overlaps with a secondary channel in the WLAN instead of a primary channel in the WLAN, or at least biases its frequency usage towards secondary channel frequencies when considering multiple factors affecting its selection of transmit and/or receive frequencies.

The processing circuit 132 is also associated with memory 134. The memory 134, in some embodiments, stores one or more computer programs 136 and, optionally, configuration data, such WLAN rules 138. Here, the "rules 138" may be understood as information or other data items indicating, e.g., defined WLAN channel frequencies for one or more frequency bands, along with information defining the possible channel pairings, which information identifies which ones of the predefined WLAN channels may be paired as primary and secondary channels in the context of the applicable WLAN specifications. The memory 134 provides non-transitory storage for the computer program 136 and it may comprise one or more types of computer-readable media, such as disk storage, solid-state memory storage, or any mix thereof. By way of non-limiting example, the memory 134 comprises any one or more of SRAM, DRAM, EEPROM, and FLASH memory.

In general, the memory 134 comprises one or more types of computer-readable storage media providing non-transitory storage of the computer program and any configuration data used by the radio node 12. Here, "non-transitory" means permanent, semi-permanent, or at least temporarily persistent storage and encompasses both long-term storage in non-volatile memory and storage in working memory, e.g., for program execution.

In turn, in at least some embodiments, the processing circuit 132 is configured to perform the interference mitigation processing taught herein at least in part based on its execution of computer program instructions comprising the computer program 136. As noted, the memory 134 also may advantageously store the WLAN rules 138, which are defined according to one or more known WLAN specifications. WLAN rules 138 specify bundles or pairings of primary and secondary channels, channel frequencies, etc. The WLAN rules 138 may be preloaded into the radio node 12, or may be signaled to it from another node in the network 10, or may be preloaded and then updated as needed, e.g., via signaling from an Operations & Maintenance Center or other such node in the network 10.

Figure 3:
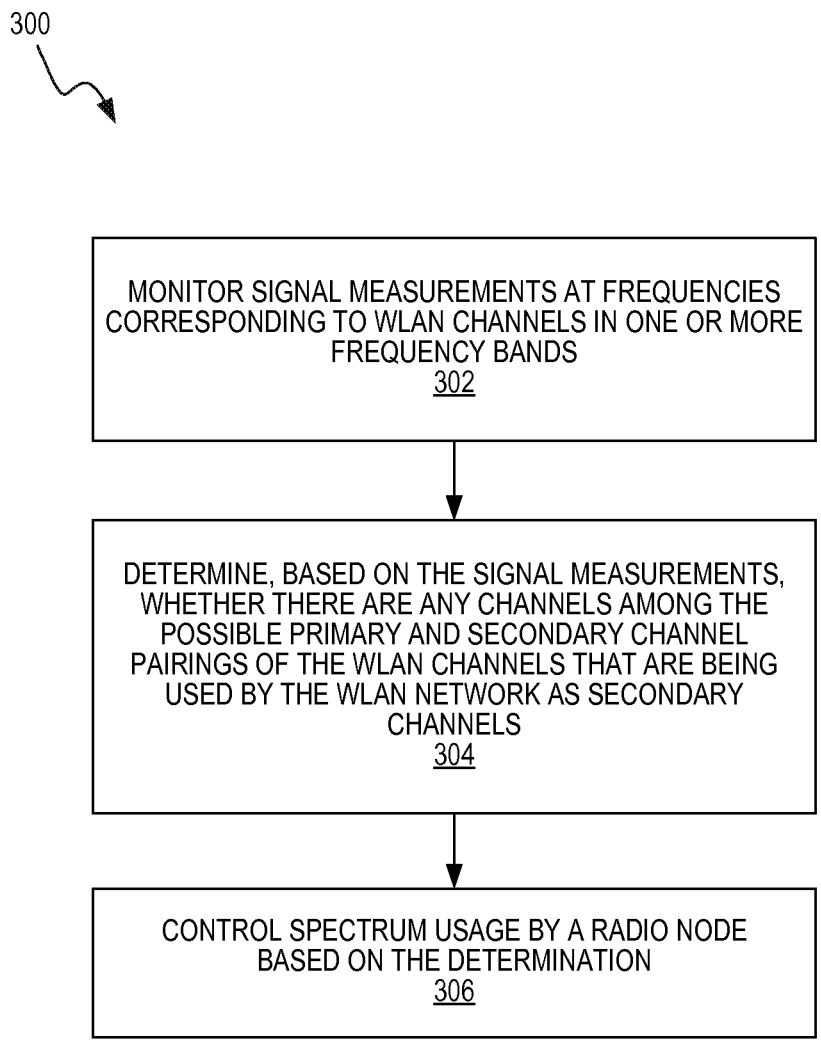
FIG. 3 is a flowchart of a method of controlling a radio node to control spectrum usage to mitigate interference in primary channels of a WLAN network, according to some embodiments.

Regardless of its specific implementation details, the processing circuit 132 of radio node 12 is configured to perform a method, such as method 300 of FIG. 3, for controlling spectrum usage by the radio node 12, to mitigate interference with respect to one or more primary channels of a WLAN 30. To that end, the processing circuit 132 is configured to monitor signal measurements at frequencies corresponding to one or more WLAN channels in one or more frequency bands (block 302 of FIG. 3). Here, it will be understood that monitoring signal measurements means collecting or otherwise evaluating received signal measurements made at frequencies corresponding to a number of defined WLAN channel frequencies and/or collecting or evaluating values derived from such measurements.

The processing circuit 132 of radio node 12 is also configured to determine, based on the signal measurements, whether there are any channels among possible primary and secondary channel pairings of the WLAN channels that are being used by a WLAN 30 as secondary channels (block 304). In some cases, a primary channel is determined by detecting a pattern of activity having characteristics indicative of primary channel usage. Such activity may be due to beacon and/or control signaling that characteristically takes place on primary channels and not on secondary channels. In these same cases or in other cases, one channel is detected as having a higher level of activity relative to another channel, and this information is used in conjunction with the WLAN rules 138 to identify primary and secondary channels. For example, for two channels that are defined by the WLAN rules as being a possible primary and secondary channel pairing, a higher activity level on one of the channels in comparison to the other one suggest actual usage by the WLAN 30 as primary and secondary channels, e.g., as compared to the two channels both being used as primary channels.

The processing circuit 132 is configured to control spectrum usage by the radio node 12 based on the determination (block 306). For example, the radio node 12 selects a frequency that corresponds to or overlaps with a secondary channel in the WLAN 30 instead of a primary channel in the WLAN 30, or at least biases its frequency usage towards secondary channel frequencies.

Figure 4A:
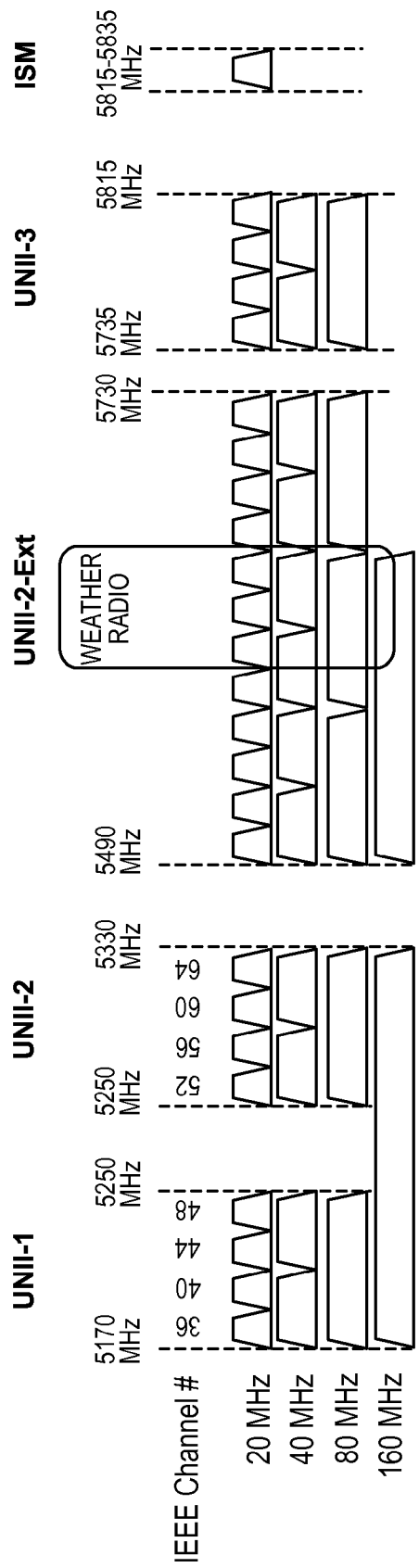
FIG. 4A is a diagram illustrating example channel frequency specifications for WiFi.

As indicated by block 304, the determining step involves evaluating "possible" primary and secondary channel pairings. Channels are paired together according to channel pairing rules of the applicable WLAN specification. FIG. 4A shows an example diagram of WiFi channels in the 5 GHz band. According to an example WLAN specification rule of WLAN rules 138, adjacent channels 36 and 40 are specified as a possible primary and secondary channel pairing. Channels 44 and 48 are another possible primary and secondary channel pairing. Other possible channel pairings may be defined by the WLAN rules 138.

It is determined whether there are any channels among these possible primary and secondary channel pairings that are being used by the WLAN 30 as secondary channels. The WLAN AP 32 shall have chosen one of the channels of a possible primary and secondary channel pairing as its primary channel based on the WLAN rules 138. Continuing with the example referencing FIG. 4A, channel 36 is chosen as a primary channel and channel 40 is chosen as a secondary channel. Also, channel 48 is chosen as a primary channel and channel 44 is chosen as a secondary channel.

The WLAN AP 32 may have selected primary and/or secondary channels within the possible channel pairings in consideration of additional rules of a WLAN specification. If the WLAN rules 138 specify these additional rules, knowledge of the additional rules may assist the processing circuit 132 in determining the primary and secondary channels of the possible channel pairings. An instance of these additional rules may specify that for a WLAN AP capable of only 20 MHz operation, the occupied channel may be, by default, its primary channel. As for WLAN APs capable of 40 MHz channels, additional rules may recommend that a 20 MHz WLAN AP does not operate in the secondary channel of an existing 40 MHz WiFi. For example, the WLAN AP 32 can use channels 36 and 40 for its operation because channels 36 and 40 are part of the same 40 MHz channel, as shown in FIG. 4A. However, the WLAN AP 32 cannot use channels 40 and 44 for its operation as they are not within the same 40 MHz channel.

In a notable aspect of the blind detection processing performed by the radio node 12, no decoding of the WLAN transmissions is needed. Instead, the radio node 12 uses its knowledge of the possible WLAN channel pairings and a relative evaluation or comparison of received signal measurements made at frequencies corresponding to the possible pairings, or values derived therefrom, to discern whether a given pair of WLAN channels is being used as a primary and secondary channel pair by the WLAN 30. While the radio node 12 may have knowledge of primary and secondary channel assignment rules 138 defined by the applicable WLAN specification, the radio node 12 "detects" secondary channels in the WLAN 30 without decoding the WLAN signal transmissions. Instead, the channels are blindly detected by monitoring the signal measurements at frequencies corresponding to the WLAN channels.

In one example of blind detection processing, characteristics indicative of primary channel usage are detected at a first channel frequency of the WLAN 30 and characteristics indicative of secondary channel usage are detected at a second channel frequency of the WLAN 30. The first and second frequencies are defined by the possible primary and secondary channel pairings, as known from primary and secondary channel pairing rules 138 stored in radio node 12. Characteristics indicative of primary channel usage may include characteristics indicative of control signaling or beacon signaling sent on primary channels but not sent on secondary channels.

Figure 4B:
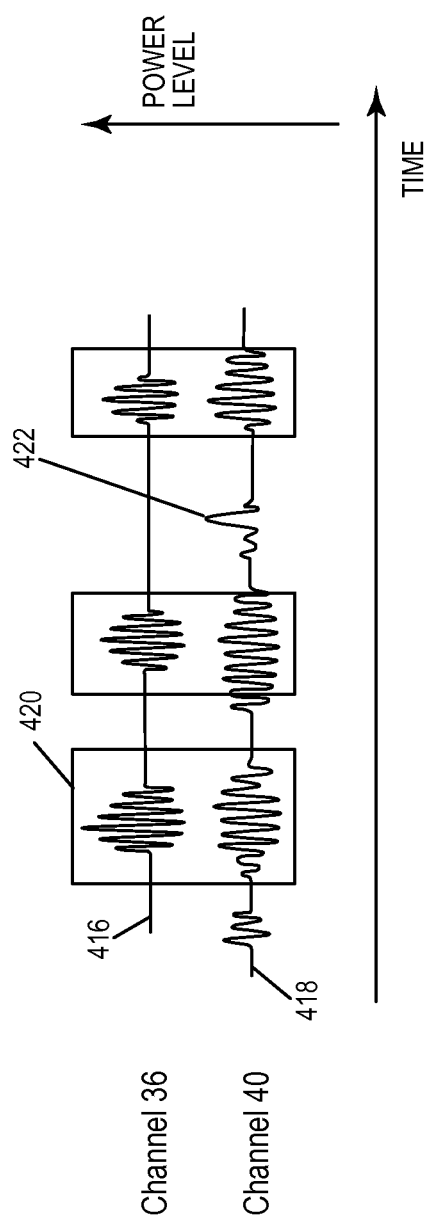
FIG. 4B is a diagram illustrating an example of activity detected on WLAN channels, according to some embodiments.

In some embodiments, the primary and secondary channels are differentiated based on assessing their respective activity levels. The primary channel can be detected as a channel characterized as having high activity levels. FIG. 4B shows a diagram illustrating an example of activity 416 detected on WLAN channel 36 and activity 418 detected on WLAN channel 40. Some amounts of data may be transmitted as part of both activity 416 and activity 418, such as shown in box 420. However, channel 40 is detected as also including beacon or command signals, such as represented by signal characteristic 422. Such activity is not present on channel 36. Therefore, it is determined that channel 40 is the primary channel and that channel 36 is the secondary channel.

In another aspect illustrated by some of the embodiments described herein, in determining primary and secondary channels, signal measurements obtained for first and second channel frequencies are jointly evaluated at each of one or more of the possible primary and secondary channel pairings. This includes detecting that the signal measurements obtained for one of the first and second channel frequencies exhibits signal activity indicative of primary channel usage and correspondingly detecting that the signal measurements obtained for the other one of the first and second channel frequencies exhibits signal activity indicative of secondary channel usage. In some cases, detection involves independent evaluations of signal activity for each channel. In other cases, detection involves an evaluation of signal activity of one channel in relative comparison to signal activity of another channel. The other channel is relevant due to knowledge of a WLAN specification that identifies possible primary and secondary channel pairings.

Determining primary and secondary channels includes accounting for signal measurements that arise from signal leakage within the transceiver circuit 126 in the radio node 12, according to some embodiments. FIG. 6 shows an example flowchart 600 for determining primary and secondary channels while accounting for signal leakage. Method 600 includes separating the signal measurements into beacon signal measurements and data signal measurements (block 602 of FIG. 6). This may be performed with circuitry as illustrated, for example, in FIG. 5.

Figure 5:
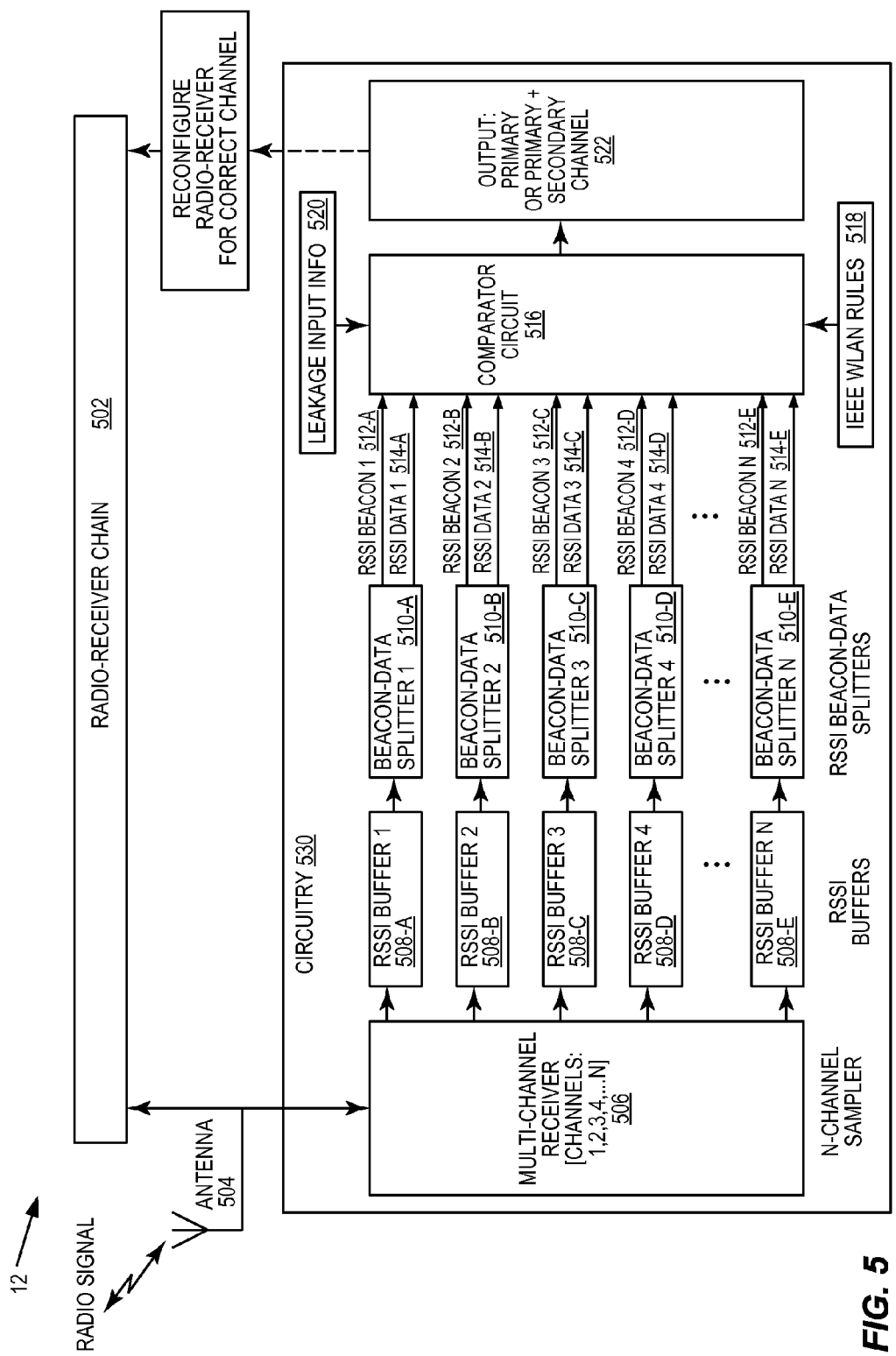
FIG. 5 is a block diagram of a radio node configured to control spectrum usage to mitigate interference in primary channels of a WLAN network, according to some embodiments.
Figure 6:
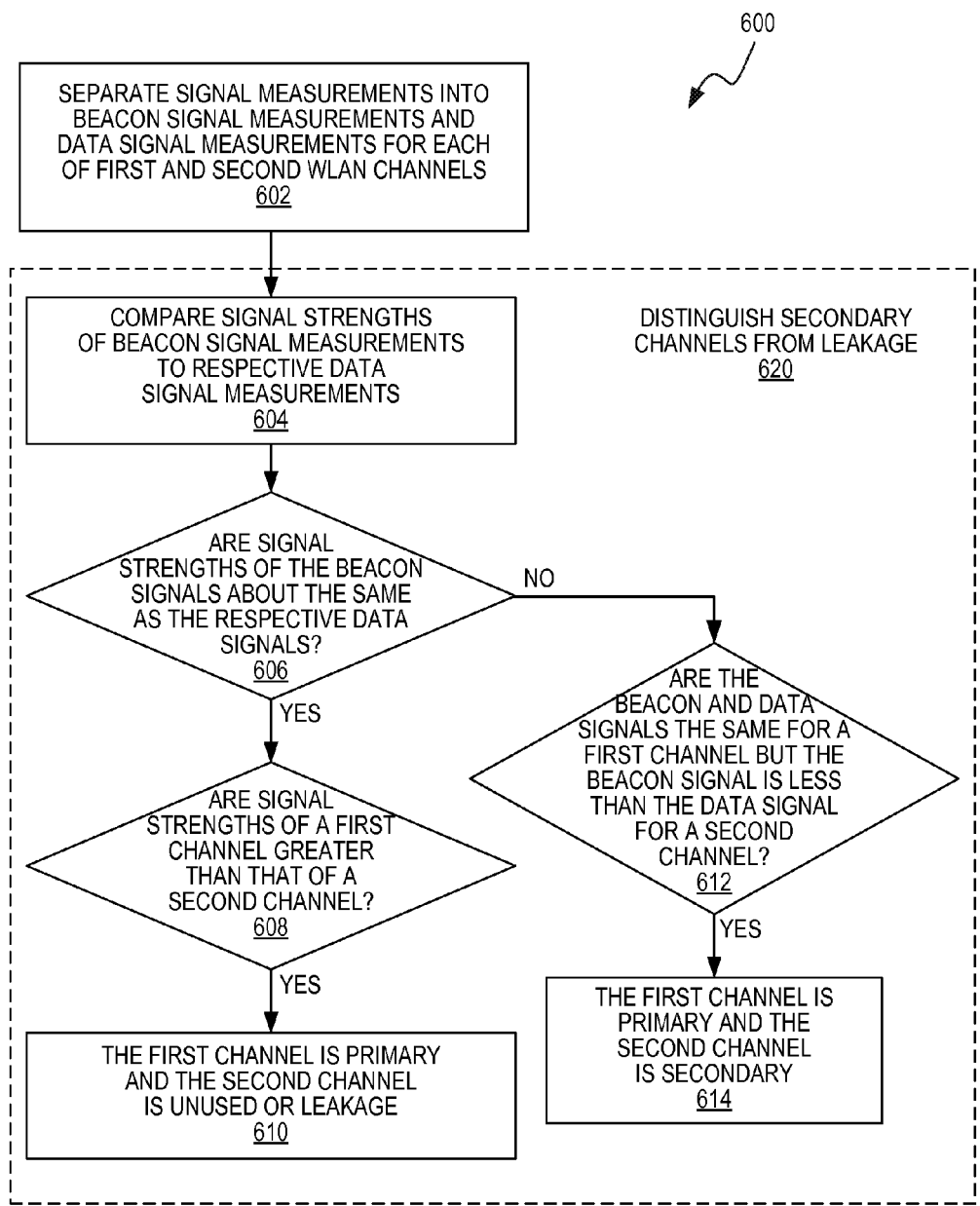
FIG. 6 is a flowchart of a method of distinguishing secondary channels from leakage, according to some embodiments.

FIG. 5 illustrates radio receiver circuitry and related processing circuitry that is implemented in one or more embodiments of the radio node 12. The radio node 12 in FIG. 5 includes a radio receiver chain 502. The radio receiver chain 502 is configured for cellular or other non-WLAN communications supported by the radio node 12. Analog radio signals are received at the antennas 504 connected to the circuitry 530. The circuitry 530 functions as a primary channel identifier or estimator. Received radio signals are fed into the circuitry 530, as well as the radio receiver chain 502 (which may initially be configured for the incorrect WLAN channel). That is, radio receiver chain 502, prior to detection of primary and secondary channels according to embodiments described herein, may have configured uplink and/or downlink carriers at WLAN channel frequencies that coincide or overlap with a WLAN primary channel, thus causing interference. FIG. 5 depicts the circuitry 530 as being implemented at the front-end of the radio receiver chain 502.

The circuitry 530 includes an N-channel sampler 506 for a multi-channel receiver. The N-channel sampler 506 samples the N-different WLAN channels "simultaneously" and continuously. Depending on the implementation, "simultaneous" sampling could be achieved by use of N parallel samplers, rapidly cycling a single sampler around the N-channels, or some other variant, such that.

Sampled signals are buffered in received signal strength indicator (RSSI) buffers 508-A to 508-E. These may be N-independent circular buffers to store the latest received RSSI values for each WLAN channel sampled (e.g., last 1-second duration worth of samples). In addition to background noise, the buffered samples may contain beacon-only signals, or data (plus beacon) signals.

These signals are split into beacon signal measurements and data signal measurements using a splitter circuit 510 configured to separate the signal measurements into beacon signal measurements, such as RSSI beacon measurements 512-A to 512-E, and data signal measurements, such as RSSI data measurements 514-A To 514-E. The splitter circuit 510 evaluates RSSI patterns, separating beacon samples from data samples. Beacon samples may appear as periodic RSSI spikes while data may appear as continuous RSSI spikes. The splitter circuit 510 includes beacon-data splitters 510-A to 510-E. A particular channel may have more than one WLAN AP operating on it. In this situation, the splitter circuit 510 contains a classifier that separates out the beacon samples into multiple bins so that the received signal levels within a bin are similar. The data samples are also similarly separated into bins.

The RSSI beacon-data splitters 510 may involve averaging. An averaging function computes the average of M of the buffered samples for each of the categories, i.e., beacon-only or beacon plus data, on each of the N different WLAN channels in each signal level bin. The averaging function serves the purpose of reducing the noise on the estimated RSSI values. The averaged values are sent to the comparator circuit 516.

The flowchart 600 of FIG. 6 illustrates an example algorithm for distinguishing secondary channels from leakage (block 620). Block 620 includes comparing the beacon and data signal measurements obtained for a first WLAN channel (block 604). This includes use of the comparator circuit 516 that is configured to compare the beacon and data signal measurements obtained for a first WLAN channel. The comparator circuit 516 receives leakage input info 520 and knowledge of the IEEE WLAN rules 518. The comparator circuit 516 is configured to compare values of adjacent channels belonging to the same channel bundle or pairing. For example, the comparator circuit 516 may compare channels 36 and 40, but not 36 and 44 (since these two channels are not adjacent as shown in FIG. 4A) and also not 40 and 44 (since these two channels do not belong to the same channel pairing). The comparator circuit 516 may also be configured to ignore certain channels, such as certain channels that cannot be primary channels.

In some embodiments, the comparing includes comparing the beacon and data signal measurements obtained for the first WLAN channel with the corresponding beacon and data signal measurements obtained for a second WLAN channel that is a candidate for secondary channel usage relative to the first WLAN channel, as is known from the possible primary and secondary channel pairings. The primary and secondary channel determinations are be provided as output 522 to the radio receiver chain 502 so that spectrum usage is controlled according to the determinations. In some embodiments, spectrum usage is controlled by controlling carrier frequency selection to favor selection of carrier frequencies corresponding to ones of the WLAN channels determined as being secondary channels.

In an example, as shown in flowchart 600, if the signal strengths of the beacon signals are about the same as the respective data signals (block 606), then it is determined whether the signal strengths of a first channel are greater than that of a second channel (block 608). If this is so, the first channel is the primary channel and the secondary channel is unused or the corresponding RSSI values merely represent leakage in the transceiver circuit of the radio node 12 (block 610).

If the signal strengths of the beacon signals are about the same as the respective data signals (block 606), then it is determined whether the beacon and data signals are the same for a first channel and if the beacon signal is less than the data signal for a second channel (block 612). If so, the first channel is a primary channel and the second channel is a secondary channel (block 614). The radio receiver chain 502 is then configured to control spectrum usage or select carrier frequencies that mitigate interference in primary channels of a WLAN 30, according to knowledge of the determined secondary channel.

Figure 7:
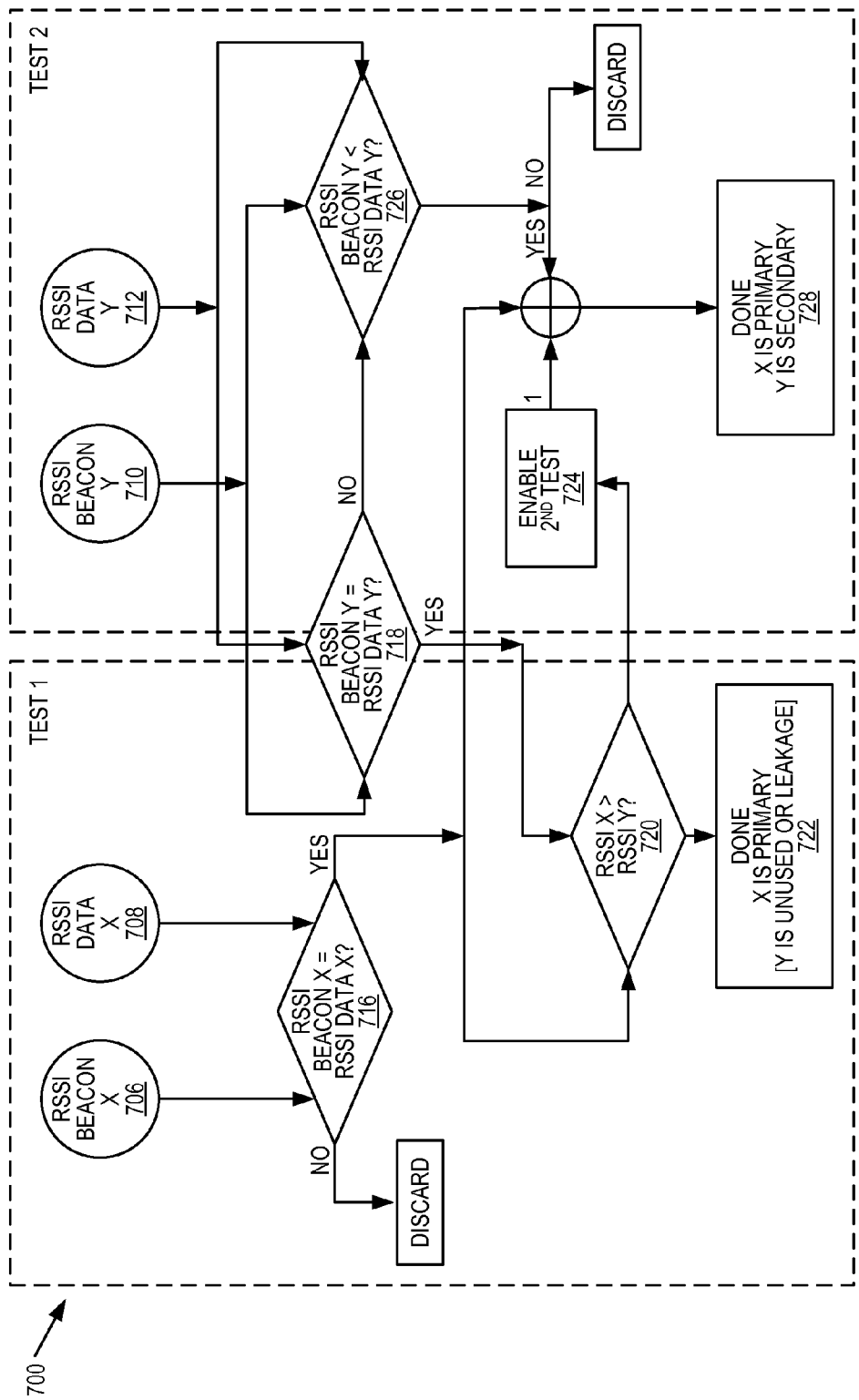
FIG. 7 is a flowchart of a further method of distinguishing secondary channels from leakage, according to some embodiments.

FIG. 7 illustrates another flowchart 700 for determining primary and secondary channels while accounting for leakage, according to some embodiments. The flowchart 700 may be implemented by circuitry 530 to determine WLAN primary-secondary channel pairings or assignments based on signal measurements, such as incoming RSSI. The flowchart 700 illustrates one contemplated algorithm for evaluating, based on corresponding RSSI values, whether two adjacent channels X and Y are being used by the WLAN 30 as primary and secondary channels. The processing illustrated in the flowchart 700 commences upon detection of WLAN activity on at least one channel. The signals on channel X are split into beacon X signal measurements 706 and data X signal measurements 708. The signals on channel Y are split into beacon Y signal measurements 710 and data Y signal measurements 712.

Test 1 is performed to determine if there is only a primary channel. For example, if the beacon X measurements are substantially equal to the data X measurements (block 716), it is determined that the X measurements pertain to the same channel X. It is determined that the Y measurements pertain to the same channel Y if the beacon Y measurements are substantially equal to the data Y measurements (block 718). Then, it is determined whether the channel measurements of one channel are greater than that of the other. In this case, it is determined whether the signal measurements of channel X are greater than those of channel Y (block 720). If so, channel X is determined to be the primary channel and the signal measurements on channel Y are determined to be leakage and channel Y is considered to be unused (block 722).

If this fails, then Test 2 is executed to determine if there is both a primary channel and a secondary channel (block 724). That is, if beacon Y measurements are not equal to the data Y measurements (block 718), it is determined whether the beacon Y measurements are less than the data Y measurements (block 726). If so, then channel X is determined to be the primary channel and channel Y is determined to be the secondary channel (block 728). The flowchart 700 may also be represented by the following flow equations:

a. If ((RSSIBeacon_X==RSSIData_X) AND (RSSIBeacon_Y==RSSIData_Y)) AND ((RSSIBeacon/Data_Y lower than RSSIBeacon/Data_X)),
then X is the primary channel, Y is leakage
b. If (RSSIBeacon_X==RSSIData_X) AND (RSSIBeacon_Y less than RSSIData_Y),
then X is the primary channel and Y is the secondary channel.

Figure 8:
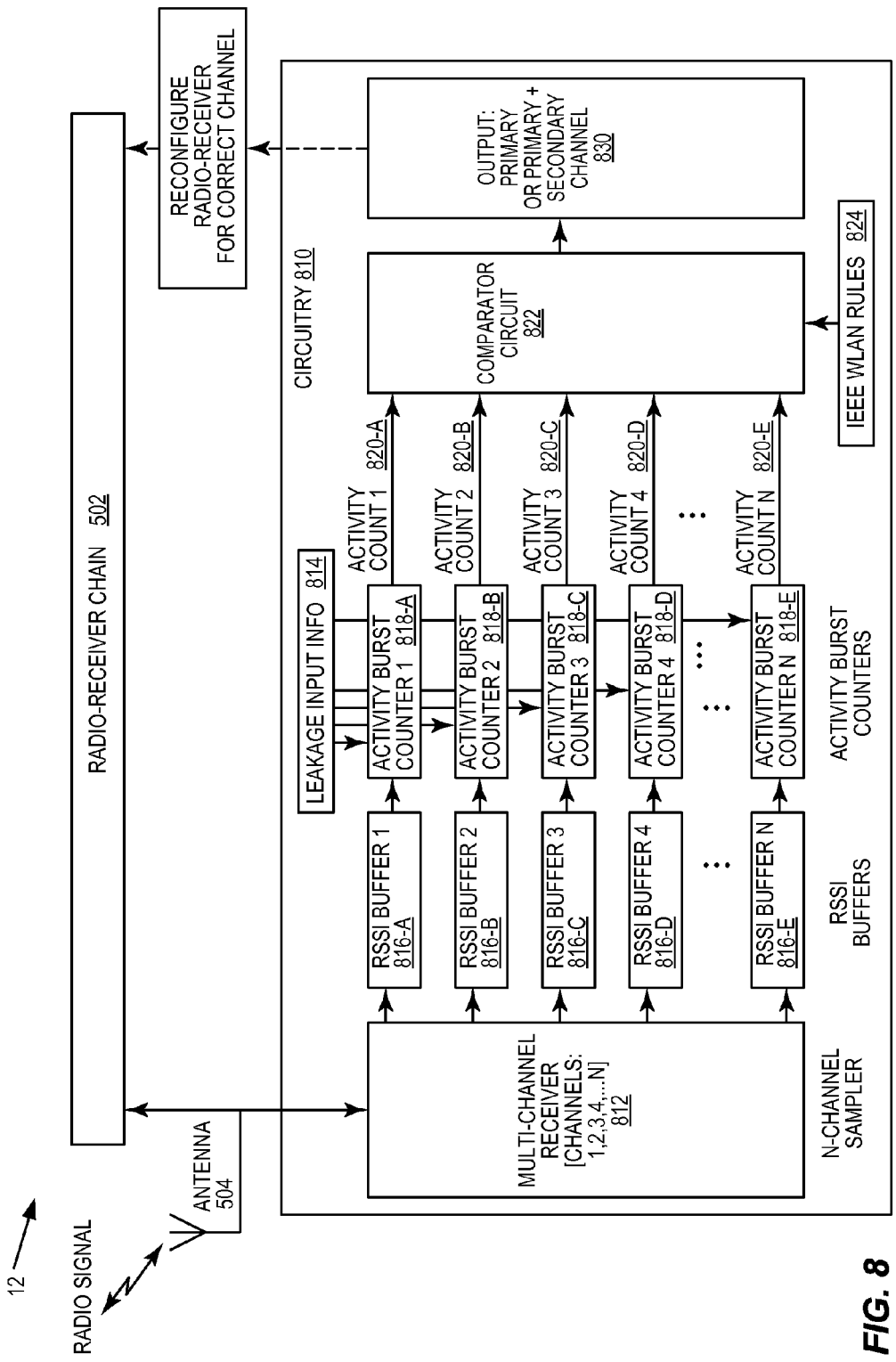
FIG. 8 is a block diagram of a radio node configured to control spectrum usage to mitigate interference in primary channels of a WLAN network, according to some embodiments.

Other embodiments for determining primary and/or secondary channels include evaluating activity bursts of frequencies corresponding to WLAN channels. While FIG. 5 shows an example block diagram of a radio node 12 configured to detect primary and secondary channels by splitting signal measurements and comparing beacon and data signal measurements, FIG. 8 shows an example block diagram of the radio node 12 configured to detect primary and secondary channels by counting activity bursts. The block diagram of FIG. 8 shows the radio receiver chain 502 and the antenna 504 that receives a radio signal. In this regard, the radio receiver chain 502 may be understood as being at least part of the radio receiver circuitry used by the radio node 12 for its non-WLAN communication signal reception and processing.

The circuitry 810 includes an N-channel sampler 812 and RSSI buffers 816-A to 816-E. From the output of each RSSI buffer 816, a counter, such as each of the activity burst counters 818-A to 818-E, calculates the number of activity bursts within a time window. The counters 818 can also take leakage information 814 into account to, for instance, remove bursts that are likely caused by adjacent channel leakage. The activity counts 820-A to 820-E may be compared by the comparator circuit 822.

The comparator circuit 822 uses knowledge of the IEEE WLAN rules 824 to determine valid channel pairs of a channel bundle for comparison. The comparator circuit 822 identifies a primary channel in a respective channel pairing, based on determining which of the WLAN channels in the respective channel pairing has a greater number of non-leakage activity bursts within a time window. This determination is possible because the primary channel carries the beacon and other control and management frames that are not transmitted on the secondary channels. It may be a further result that some WLAN APs operate only one channel, which is by default the primary channel and hence follows a primary channel alignment rule. In some cases, the leakage information 814 is provided to the comparator circuit 822.

The comparator circuit 822 determines an output 830 of a primary channel and/or a primary-secondary channel pairing. This output 830 may be used to reconfigure the radio receiver chain 502 to control spectrum usage. This may include controlling carrier frequency selection to favor selection of carrier frequencies corresponding to ones of the WLAN channels determined as being secondary channels.

Figure 9:
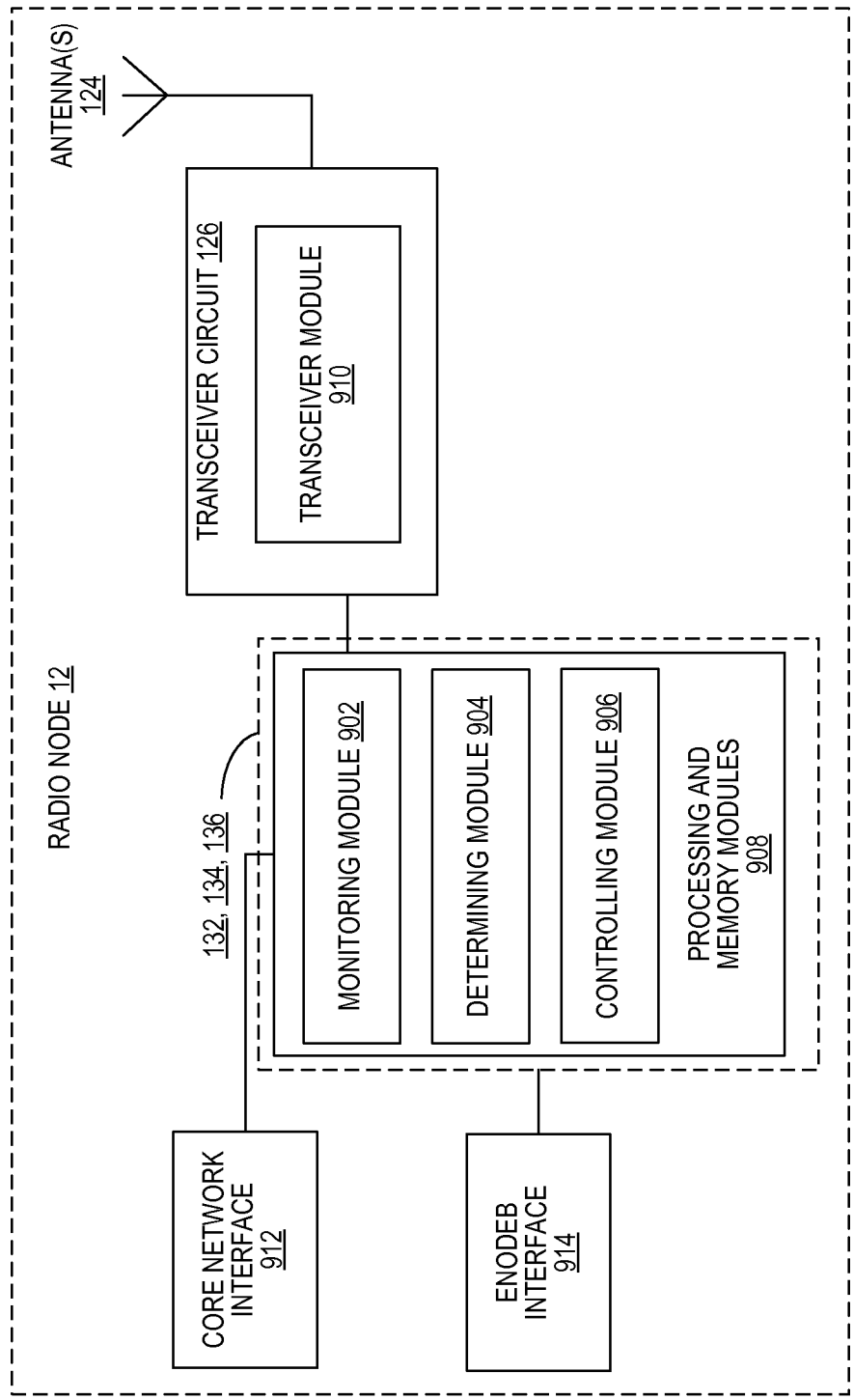
FIG. 9 is a block diagram of a radio node configured to control spectrum usage to mitigate interference in primary channels of a WLAN network, according to some embodiments.

FIG. 9 illustrates an example functional module or circuit architecture as may be implemented in the radio node 12, e.g., based on the processing circuit 132 executing computer program instructions included in the computer program 136 stored in the storage memory 134, which is functionally represented by processing and memory modules 908. The illustrated embodiment at least functionally includes a monitoring module 902 for monitoring signal measurements at frequencies corresponding to one or more WLAN channels in one or more frequency bands. The embodiment also includes a determining module 904 for determining, based on the signal measurements at the frequencies, whether there are any channels among possible primary and secondary channel pairings of the one or more WLAN channels that are being used by the WLAN 30 as secondary channels. The embodiment also includes a controlling module 906 for controlling spectrum usage by the radio node 12 based on the determining.

The processing and memory modules 908 are connected to a transceiver module 910 that represents functionality of the transceiver circuit 126, which is associated with the antennas 124. The radio node 12 includes an eNodeB interface 914 for allowing the radio node 12 to exchange information with other radio nodes, such as through an X2 interface. The radio node 12 also includes a core network interface 912 to exchange information with nodes in a core network, such as through an S1 interface.

Figure 10:
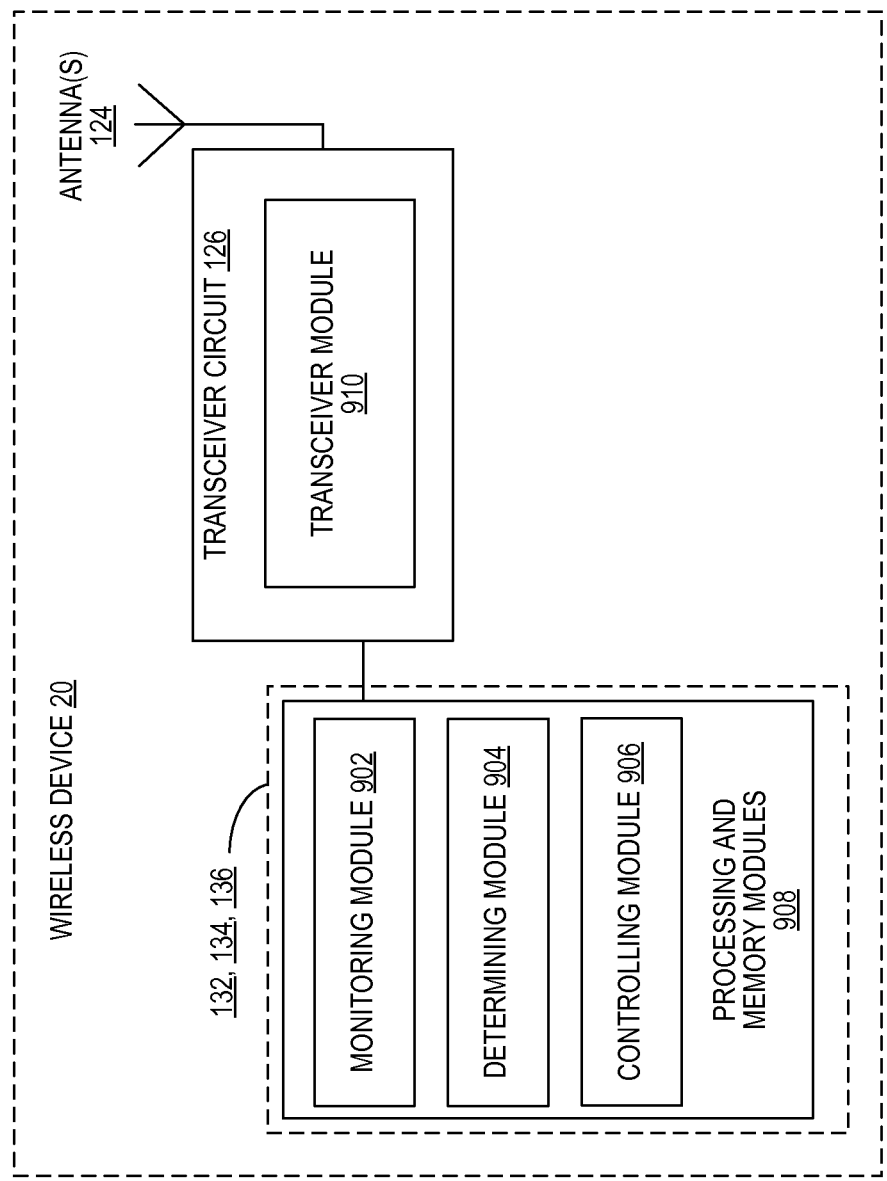
FIG. 10 is a block diagram of a wireless device configured to control spectrum usage to mitigate interference in primary channels of a WLAN network, according to some embodiments.

While various embodiments have been described as being performed by a radio node 12. In some embodiments, the functionality and/or circuitry of the radio node 12 are implemented in other devices, including in the wireless device 20. FIG. 10 illustrates an example functional module or circuit architecture as may be implemented in the wireless device 20, e.g., based on the processing circuit 132 executing computer program instructions included in the computer program 136 stored in the storage memory 134, which may be functionally represented by the processing and memory modules 908. The illustrated embodiment at least functionally includes the monitoring module 902 for monitoring signal measurements at frequencies corresponding to one or more WLAN channels in one or more frequency bands. The embodiment also includes the determining module 904 for determining, based on the signal measurements at the frequencies, whether there are any channels among possible primary and secondary channel pairings of the one or more WLAN channels that are being used by the WLAN 30 as secondary channels. The embodiment also includes the controlling module 906 for controlling spectrum usage by the wireless device 20 based on the determining.

The wireless device 20 of FIG. 10 may be configured for machine-to-machine (M2M) or machine-type communication (MTC). The processing and memory modules 908 are connected to the transceiver module 910 of the transceiver circuit 126, which is associated with the antennas 124. The wireless device 20 optionally includes a satellite positioning system (e.g., GPS) receiver module to determine a speed or movement of the wireless device 20.

The embodiments described herein provide methods and apparatuses to determine WLAN primary and secondary channels in use without having any WLAN decoding capability, or by blind detection. By using blind detection and knowledge of the WLAN specification, non-WLAN capable receivers operating on the same ISM band frequencies as WLAN can detect these channels assignments. Blind detection has an advantage in that no additional radio-specific hardware modifications to the non-WLAN receivers may be necessary to extract WLAN-beacon information, e.g., demodulators, decoders, etc. Instead, monitoring of observed raw received signal strength indicator or RSSI values on different channels of operation is all that may be required by the hardware. These RSSI patterns may be compared, in light of a known set of rules based on the WLAN specifications on channel allocation and behavior.

For example, received signal-strength indicator, RSSI, patterns from one or more WLAN system transmissions are monitored. Potential signal leakage within the transceiver circuitry of the radio node 12 is taken into account. With knowledge of WLAN specifications, the radio node 12 deduces usage of the WLAN primary and secondary channels via heuristic techniques, such as any of the algorithms set forth in the above example embodiments. Spectrum usage by the radio node 12 is then controlled based on a determination of the primary and secondary assignments. This may involve selecting carrier frequencies that are less likely to interfere with primary channels of a WLAN.

The embodiments may also be advantageous for situations involving imperfections in a WLAN device and a non-WLAN transceiver circuit. These imperfections can include adjacent channel leakage at the WLAN transmitter side and non-ideal adjacent channel selectivity at the non-WLAN receiver side. Radio signal leakage between adjacent channels can be accounted for and the primary and secondary channels can still be determined.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of controlling a radio node to control spectrum usage to mitigate interference in primary channels of a Wireless Local Area Network (WLAN), said method comprising:
    monitoring signal measurements at frequencies corresponding to one or more WLAN channels in one or more frequency bands;
    determining, based on the signal measurements, whether there are any channels among possible primary and secondary channel pairings of the one or more WLAN channels that are being used by the WLAN as secondary channels; and
    controlling spectrum usage by the radio node based on said determining, wherein said controlling spectrum usage includes controlling carrier frequency selection by the radio node to favor selection of carrier frequencies corresponding to ones of the one or more WLAN channels determined as being secondary channels.

2. The method of claim 1, wherein said determining includes blindly detecting whether any WLAN channels among the possible channel pairings are being used by the WLAN as secondary channels, without decoding WLAN signal transmissions.

3. The method of claim 1, wherein the WLAN comprises a WiFi network and the one or more WLAN channels comprise one or more WiFi channels.

4. The method of claim 1, wherein the radio node comprises a base station in a Radio Access Network (RAN) of a cellular communication system, and wherein the base station performs the method of claim 1.

5. The method of claim 1, wherein said determining includes detecting a primary channel in the WLAN by detecting characteristics indicative of primary channel usage at a first channel frequency of the WLAN, and detecting a secondary channel in the WLAN by detecting characteristics indicative of secondary channel usage at a second channel frequency of the WLAN defined by the possible primary and secondary channel pairings, as known from primary and secondary channel pairing rules stored in the non-WLAN node.

6. The method of claim 5, wherein the characteristics indicative of primary channel usage comprise characteristics indicative of at least one of control signaling and beacon signaling sent on primary channels but not sent on secondary channels.

7. The method of claim 1, wherein said determining further comprises jointly evaluating signal measurements obtained for first and second channel frequencies at each of one or more of the possible primary and secondary channel pairings, including detecting that the signal measurements obtained for one of the first and second channel frequencies exhibits signal activity indicative of primary channel usage and correspondingly detecting that the signal measurements obtained for the other one of the first and second channel frequencies exhibits signal activity indicative of secondary channel usage.

8. The method of claim 7, wherein said correspondingly detecting includes accounting for any apparent signal activity that is attributable to leakage within a transceiver circuit of the radio node.

9. The method of claim 1, wherein the signal measurements comprise received signal-strength indicators (RSSIs).

10. The method of claim 1, wherein said determining includes accounting for signal measurements that arise from signal leakage within a transceiver circuit in the radio node.

11. The method of claim 10, wherein said accounting for the signal measurements that arise from signal leakage includes:
    separating the signal measurements into beacon signal measurements and data signal measurements; and
    comparing the beacon and data signal measurements obtained for a first WLAN channel.

12. The method of claim 11, wherein said comparing further includes comparing the beacon and data signal measurements obtained for the first WLAN channel with the corresponding beacon and data signal measurements obtained for a second WLAN channel that is a candidate for secondary channel usage relative to the first WLAN channel, as is known from the possible primary and secondary channel pairings.

13. The method of claim 1, wherein said determining includes identifying a primary channel in a respective channel pairing, based on determining which of the WLAN channels in the respective channel pairing has a greater number of non-leakage activity bursts within a time window.

14. A radio node configured to control spectrum usage to mitigate interference in primary channels of a Wireless Local Area Network (WLAN), said radio node comprising:
 a transceiver circuit configured to transmit and receive wireless signals; and
 a processing circuit operatively connected to the transceiver circuit and configured to:
  monitor signal measurements generated from wireless transmissions detected at frequencies corresponding to one or more WLAN channels in one or more frequency bands;
  determine, based on the signal measurements, whether there are any channels among possible primary and secondary channel pairings of the one or more WLAN channels that are being used by the WLAN as secondary channels; and
  control spectrum usage by the radio node based on the determination, by controlling carrier frequency selection to favor selection of carrier frequencies corresponding to ones of the one or more WLAN channels determined as being secondary channels.

15. The radio node of claim 14, wherein the processing circuit is configured to blindly detect whether any WLAN channels among the possible channel pairings are being used by the WLAN as secondary channels, without decoding WLAN transmissions.

16. The radio node of claim 14, wherein the WLAN comprises a WiFi network and the plurality of WLAN channels comprises a plurality of WiFi channels.

17. The radio node of claim 14, wherein the radio node comprises a base station in a Radio Access Network (RAN) of a cellular communication system.

18. The radio node of claim 14, wherein the processing circuit is configured to detect a primary channel in the WLAN by detecting characteristics indicative of primary channel usage at a first channel frequency of the WLAN, and detect a secondary channel in the WLAN by detecting characteristics indicative of secondary channel usage at a second channel frequency defined by the possible primary and secondary channel pairings, as known from primary and secondary channel pairing rules stored in the non-WLAN node.

19. The radio node of claim 18, wherein the characteristics indicative of primary channel usage comprise characteristics indicative of at least one of control signaling and beacon signaling sent on primary channels but not sent on secondary channels.

20. The radio node of claim 14, wherein the processing circuit is configured to jointly evaluate signal measurements obtained for first and second channel frequencies at each of one or more of the possible primary and secondary channel pairings, including detecting that one of the first and second channel frequencies exhibits signal activity indicative of primary channel usage and correspondingly detecting that the other one of the first and second channel frequencies exhibits signal activity indicative of secondary channel usage.

21. The radio node of claim 20, wherein the processing circuit is configured to correspondingly detect that the other one of the first and second channel frequencies exhibits signal activity indicative of secondary channel usage by accounting for any apparent signal activity seen on the other one of the first and second channel frequencies that is attributable to leakage within a transceiver circuit of the radio node.

22. The radio node of claim 14, wherein the signal measurements comprise received signal-strength indicators (RSSIs).

23. The radio node of claim 14, wherein the processing circuit is further configured to account for signal measurements that arise from signal leakage within the transceiver circuit.

24. The radio node of claim 23, wherein the processing circuit is configured to account for signal leakage via:
 a splitter circuit configured to separate the signal measurements into beacon signal measurements and data signal measurements; and
 a comparator circuit configured to compare the beacon and data signal measurements obtained for a first WLAN channel.

25. The radio node of claim 24, wherein the comparator circuit is configured to compare the beacon and data signal measurements obtained for the first WLAN channel with the corresponding beacon and data signal measurements obtained for a second WLAN channel that is a candidate for secondary channel usage relative to the first WLAN channel, as is known from the possible primary and secondary channel pairings.

26. The radio node of claim 14, wherein the processing circuit is configured to identify a primary channel in a respective channel pairing, based on determining which of the WLAN channels of the respective channel pairing has a greater number of non-leakage activity bursts within a time window.

27. A non-transitory computer readable storage medium storing a computer program comprising program instructions which, when executed on at least one processing circuit of a radio node, cause the radio node to:
 monitor signal measurements at frequencies corresponding to one or more Wireless Local Area Network (WLAN) channels in one or more frequency bands;
 determine, based on the signal measurements at the frequencies, whether there are any channels among possible primary and secondary channel pairings of the one or more WLAN channels that are being used by a WLAN as secondary channels; and
 control spectrum usage by the radio node based on the determination, by controlling carrier frequency selection to favor selection of carrier frequencies corresponding to ones of the one or more WLAN channels determined as being secondary channels.

28. A radio node configured to control spectrum usage to mitigate interference primary channels of a Wireless Local Area Network (WLAN), said radio node comprising:
 a monitoring means for monitoring signal measurements generated from wireless transmissions detected at frequencies corresponding to one or more WLAN channels in one or more frequency bands; and
 a determining means for determining, based on the signal measurements at the frequencies, whether there are any channels among possible primary and secondary channel pairings of the one or more WLAN channels that are being used by the WLAN as secondary channels; and
 a controlling means for controlling spectrum usage by the radio node based on the determining, wherein said controlling spectrum usage includes controlling carrier frequency selection to favor selection of carrier frequencies corresponding to ones of the one or more WLAN channels determined as being secondary channels.

29. A radio node configured to control spectrum usage to mitigate interference in primary channels of a Wireless Local Area Network (WLAN), said radio node comprising:
a monitoring module configured to monitor signal measurements generated from wireless transmissions detected at frequencies corresponding to one or more WLAN channels in one or more frequency bands;
a determining module configured to determine, based on the signal measurements at the frequencies, whether there are any channels among possible primary and secondary channel pairings of the one or more WLAN channels that are being used by the WLAN as secondary channels; and
a controlling module configured to control spectrum usage by the radio node based on the determining, by controlling carrier frequency selection to favor selection of carrier frequencies corresponding to ones of the one or more WLAN channels determined as being secondary channels.

* * * * *